(12) United States Patent
Brown et al.

(10) Patent No.: US 7,512,828 B2
(45) Date of Patent: Mar. 31, 2009

(54) PROCESSOR WITH FLEXIBLE CLOCK CONFIGURATION

(75) Inventors: David A. Brown, Austin, TX (US); Hanan Z. Moller, Austin, TX (US)

(73) Assignee: Agere Systems Inc., Allentown, PA (US)

( * ) Notice: Subject to any disclaimer, the term of this patent is extended or adjusted under 35 U.S.C. 154(b) by 415 days.

(21) Appl. No.: 11/361,820

(22) Filed: Feb. 24, 2006

(65) Prior Publication Data
US 2007/0204186 A1   Aug. 30, 2007

(51) Int. Cl.
G06F 1/08 (2006.01)
(52) U.S. Cl. .................... 713/501; 713/600; 327/295
(58) Field of Classification Search .............. 713/501, 713/600; 326/96; 327/295
See application file for complete search history.

(56) References Cited

U.S. PATENT DOCUMENTS 7,078,952 B2 * 7/2006 Ruat et al. ................. 327/291
2003/0074464 A1 * 4/2003 Bohrer et al. .............. 709/232
2006/0101300 A1 * 5/2006 Singer et al. .............. 713/500

* cited by examiner

Primary Examiner—Thuan N Du
(74) Attorney, Agent, or Firm—Ryan, Mason & Lewis, LLP (57) ABSTRACT

A network processor or other type of processor includes clock generation circuitry which generates one or more clock signals for each of a number of clock domains of the processor. The clock generation circuitry comprises at least one clock generator and at least one control register subject to software-based updating. The clock generation circuitry determines a first clock configuration for the processor based on sampling one or more external clock configuration signal lines of the processor, and configures the clock generator in accordance with the first clock configuration. The clock generation circuitry subsequently determines a second clock configuration for the processor, different than the first clock configuration, based on contents of at least one control register subject to software-based updating, and reconfigures the clock generator in accordance with the second clock configuration.

18 Claims, 5 Drawing Sheets

PROCESSOR WITH FLEXIBLE CLOCK CONFIGURATION

FIELD OF THE INVENTION

The present invention relates generally to processors, such as network processors suitable for use in packet processing systems, and more particularly to clock generation techniques in such processors.

BACKGROUND OF THE INVENTION

Network elements such as routers and switches utilize network processors to perform packet processing operations. These network processors are typically implemented in the form of integrated circuits, and include phase-locked loop (PLL) based clock generation circuitry which generates clock signals for the processor core as well as one or more additional clock domains. These additional clock domains may include, for example, domains associated with different types of internal or external memory, such as double data rate (DDR) memory, a host processor, other logic circuitry, etc. It is often desirable to operate the various processor clock domains at different clock rates. For example, the DDR memory domain may operate at a higher clock rate than the processor core. Also, power consumption can often be reduced in a network processor by operating certain domains at clock rates which vary depending upon processing conditions and other factors. Accordingly, the clock generation circuitry is preferably configurable to provide different clock signals to the different domains.

The configuration of the clock generation circuitry is typically achieved in conventional practice by providing the network processor integrated circuit with a number of external clock configuration pins. By applying appropriate logic signals to these external clock configuration pins, usually in conjunction with a circuit reset operation, one can control the configuration of the clock generation circuitry and the particular type of clock signals that it supplies to the various clock domains.

A significant problem associated with this conventional practice is that the number of external pins available on a typical network processor integrated circuit is usually very limited. Increasing the number of pins dedicated to clock configuration can have a negative impact on integrated circuit cost or board design. As a result, the number of different configurations that may be supported is unduly restricted, and the clock configuration does not have the desired level of flexibility. Alternative approaches, such as those involving the use of flash memory, can add excessive cost and complexity to the processor.

It is therefore apparent that a need exists for improved clock generation techniques for use in network processors and other types of processors, so as to provide greater flexibility in clock configuration while avoiding the need for additional pins or flash memory.

SUMMARY OF THE INVENTION

The invention in an illustrative embodiment provides a network processor in which clock generation circuitry determines an initial clock configuration for the processor based on sampling of one or more external clock configuration signal lines, and determines a subsequent clock configuration for the processor based on the contents of one or more control registers, where the control registers are updatable under software control.

In accordance with an aspect of the invention, a network processor or other type of processor includes clock generation circuitry which generates one or more clock signals for each of a number of clock domains of the processor. The clock generation circuitry comprises at least one clock generator and at least one control register subject to software-based updating. The clock generation circuitry determines a first clock configuration for the processor based on sampling one or more external clock configuration signal lines of the processor, and configures the clock generator in accordance with the first clock configuration. The clock generation circuitry subsequently determines a second clock configuration for the processor, different than the first clock configuration, based on contents of at least one control register subject to software-based updating, and reconfigures the clock generator in accordance with the second clock configuration.

In the illustrative embodiment, the clock generator comprises at least one phase-locked loop coupled to at least one clock generation block. The phased-locked loop and the clock generation block have respective current configuration control registers associated therewith. In addition, the phased-locked loop and the clock generation block have respective next configuration control registers associated therewith. The next configuration control registers are subject to software-based updating. The clock generation circuitry further comprises a sequencer, with the sequencer being operative to configure the clock generator in accordance with the first or second clock configurations and to maintain additional circuitry of the processor in an internally-controlled reset state until an output of the clock generator has stabilized.

Advantageously, the techniques of the invention in the illustrative embodiments allow the clock generation circuitry to be easily and flexibly configured under software control, thereby supporting a large number of possible configurations, without the need for additional external pins or costly and complex flash memory approaches.

DETAILED DESCRIPTION OF THE INVENTION

The invention will be illustrated herein in conjunction with an exemplary packet processing system which includes a network processor configured in a particular manner. It should be understood, however, that the invention is more generally applicable to any processor in which it is desirable to provide enhanced efficiency and flexibility in clock configuration.

A "processor" as the term is used herein may be implemented, by way of example and without limitation, utilizing a microprocessor, central processing unit (CPU), digital signal processor (DSP), application-specific integrated circuit (ASIC), or other type of data processing device, as well as portions and combinations of these and other devices.

The present invention in an illustrative embodiment provides an improved approach to clock configuration in which initial configuration settings are determined from external clock configuration pins, but numerous alternative configurations can be achieved through the use of software-updatable control registers.

Figure 1:
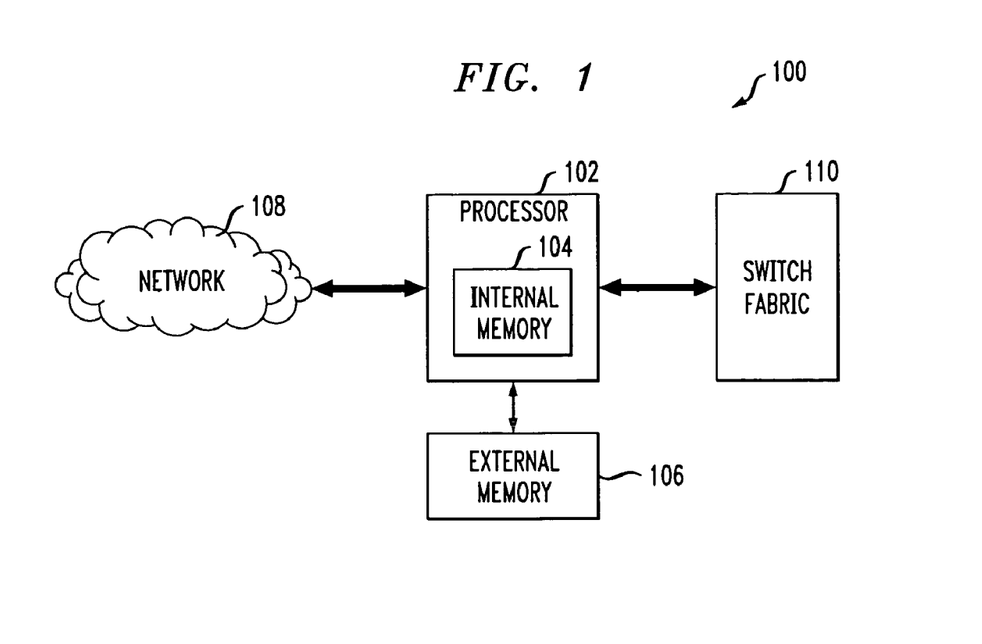
FIG. 1 is a simplified block diagram of a packet processing system in which the present invention is implemented.

FIG. 1 shows a packet processing system 100 in which the invention is implemented. The system 100 includes a network processor 102 having an internal memory 104. The network processor 102 is coupled to an external memory 106 as shown, and is configured to provide an interface between a network 108 from which packets are received and a switch fabric 110 which controls switching of packet data. The processor 102 and its associated external memory 106 may be implemented, e.g., as one or more integrated circuits installed on a line card of a router or switch, as will be described in conjunction with FIG. 5. In such a configuration, the switch fabric 110 is generally considered to be a part of the router or switch.

Although the memory 106 is shown in the figure as being external to the processor 102, the term "processor" as used herein is intended to be sufficiently broad to encompass elements such as memory 106, a host processor, etc. Thus, in various embodiments of the invention, such elements may be considered either internal to or external to a processor.

It should be understood that the particular arrangement of system elements shown in FIG. 1 is by way of illustrative example only. As previously noted, the invention can be implemented in any type of processor, and is not limited to any particular packet processing application or other processing application.

Figure 2:
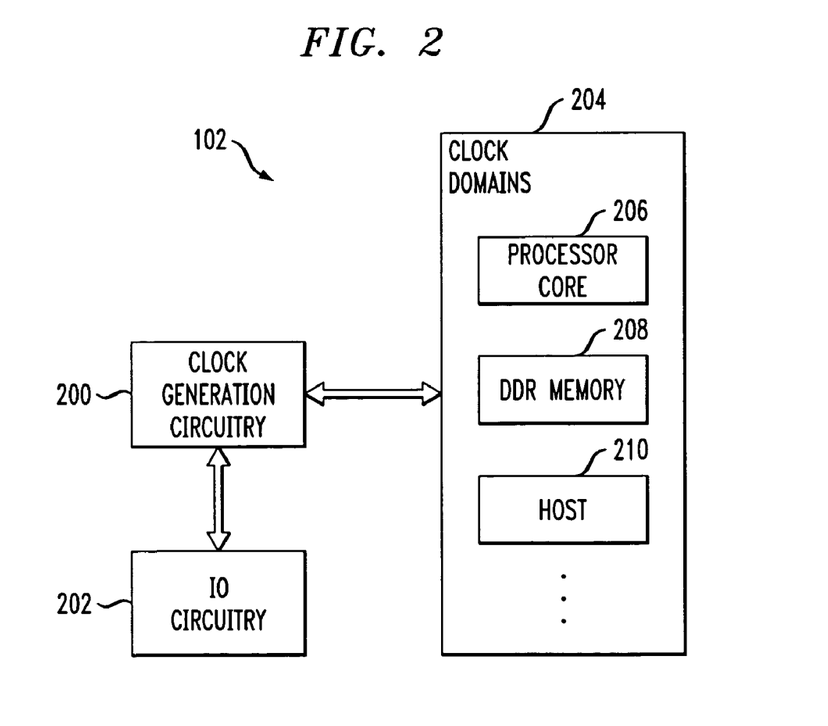
FIG. 2 is a more detailed view of a network processor of the FIG. 1 system configured in accordance with the techniques of the invention.

FIG. 2 shows the network processor 102 in greater detail. The processor 102 in this embodiment includes clock generation circuitry 200, input/output (IO) circuitry 202, and a plurality of clock domains 204. Each clock domain represents a particular portion of the network processor 102, or associated supporting circuitry such as external memory 106 or an external host processor, that receives one or more clock signals from the clock generation circuitry 200. Examples of clock domains include the processor core domain 206, a DDR memory domain 208, a host processor domain 210, etc. The processor core domain 206 may comprise, for example, a CPU or other processing element of the network processor 102. In a typical arrangement in which the DDR memory and host processor are external to the network processor 102, their respective domains 208 and 210 may comprise, for example, interface circuitry through which clock signals are supplied from the clock generation circuitry 200 to these external elements.

Other examples of clock domains that may be present in a given embodiment of the invention include other DDR or non-DDR memory domains, datapath logic domains, general purpose output clock pin domains, and IO interface domains such as input port clock domains, output port clock domains, etc.

The term "clock domain" as used herein should be understood to include a portion of a processor which receives one or more particular clock signals from clock generation circuitry. Those clock signals may be used internally, as in the case of the processor core domain, or passed on to external elements, such as an external memory or a host processor.

The IO circuitry 202 may comprise, for example, conventional interface circuitry for interfacing one or more external clock configuration pins of network processor 102 to the clock generation circuitry 200. Such IO circuitry is well known to those skilled in the art, and therefore will not be further described herein.

The network processor 102 may include additional elements not explicitly shown in FIG. 2. For example, the network processor may comprise one or more of a segmentation engine, a classification engine, protocol data unit (PDU) buffers, a buffer controller, a queuing engine, a traffic shaper, traffic scheduler or other type of traffic manager, a link list controller, a policing engine, a statistics engine, etc. These and other elements may be implemented in a conventional manner.

It is to be appreciated that the particular clock domains shown in the figure are by way of example only. Any type of processing element of the network processor 102, or portions of such processing elements, may be clock domains for which flexible configuration of clock signals is provided using the techniques of the invention.

Generally, the clock generation circuitry 200 comprises a number of control registers that are preferably updatable under software control. The clock generation circuitry is configured to determine an initial clock configuration for the processor based on sampling of one or more external clock configuration pins or other external clock configuration signal lines of the processor, and to determine a subsequent clock configuration for the processor based on contents of the control registers.

Figure 3:
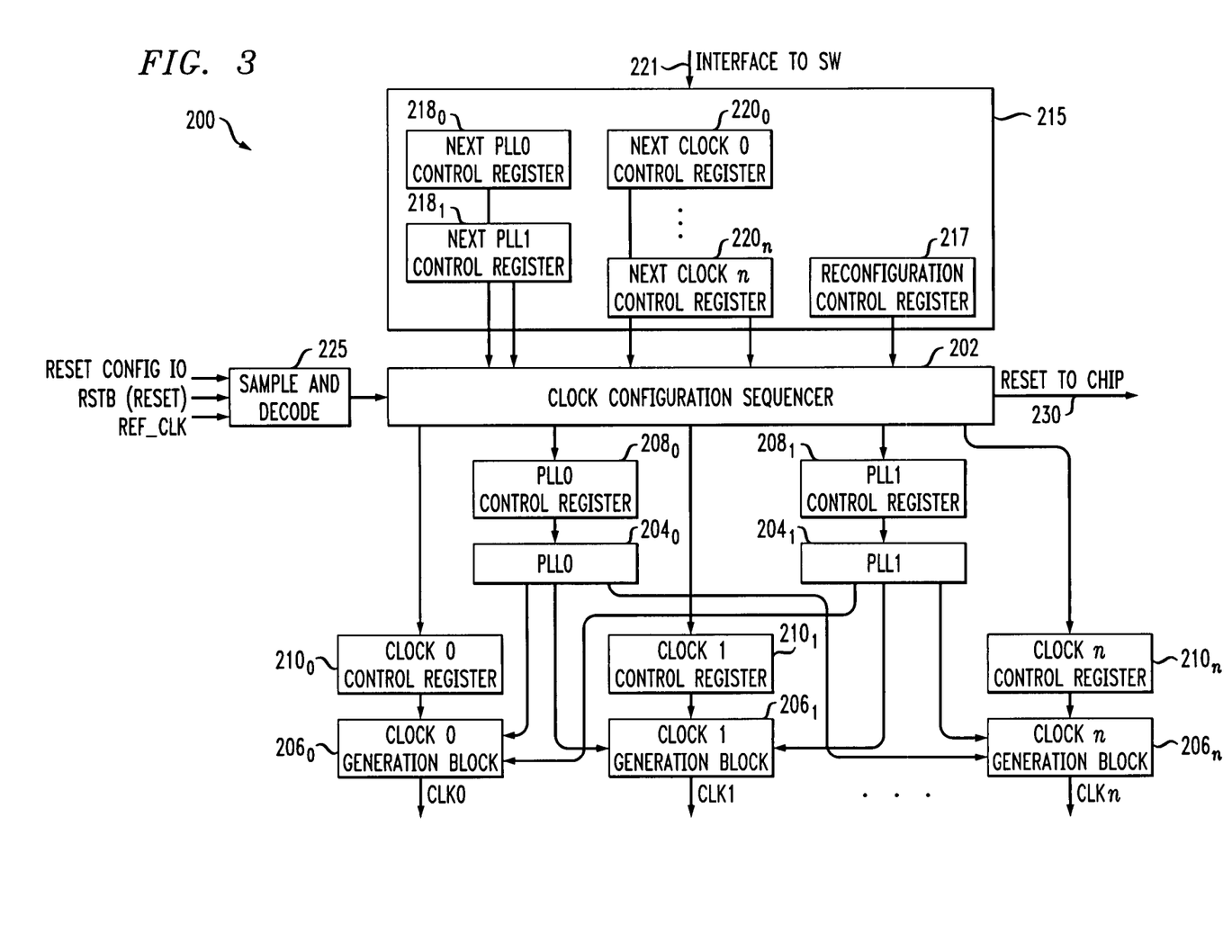
FIG. 3 shows one possible implementation of clock generation circuitry in the network processor of FIGS. 1 and 2 in an illustrative embodiment of the invention.

FIG. 3 shows a more detailed view of one possible implementation of clock generation circuitry 200. The clock generation circuitry comprises a clock configuration sequencer 202 and first and second PLLs, also referred to as PLL0 and PLL1 and denoted by reference numerals $204_0$ and $204_1$, respectively. Although two PLLs are shown, other embodiments may include a single PLL or more than two PLLs. The clock generation circuitry further comprises clock generation blocks $206_0, 206_1, \ldots 206_n$, which generate respective ones of n+1 different output clocks, denoted Clock 0, Clock 1, ... Clock n. These different output clocks may be supplied to different ones of the clock domains 204 of FIG. 2. Other embodiments may include only a single clock generation block. In this embodiment, each of the clock generation blocks has inputs coupled to outputs of the PLLs PLL0 and PLL1. The PLLs and the clock generation blocks may be of conventional design, of a type familiar to those skilled in the art. For example, the clock generation blocks may contain various arrangements of controllable divider circuits, adapted to provide the desired selectability of output clock rates for a given application.

Also included in the clock generation circuitry are control registers which include PLL0 control register $208_0$, PLL1 control register $208_1$, clock control registers $210_0$ through $210_n$, and additional control registers 215.

The additional control registers 215 comprise a reconfiguration control register 217, a Next PLL0 control register $218_0$, a Next PLL1 control register $218_1$, Next Clock 0 control register $220_0$, ..., and Next Clock n control register $220_n$. Each of these additional control registers is coupled to the sequencer as shown. The additional control registers 215 are dynamically programmable via a software interface 221 under the control of a processing unit, such as a CPU or other processor core. This programmability feature may also or alternatively be provided using a host processor that is external to the processor 102, and coupled thereto via an interface bus or other suitable interconnection.

The PLL0 control register $208_0$, PLL1 control register $208_1$, and clock control registers $210_0$ through $210_n$ are examples of what are more generally referred to herein as current configuration control registers, as such registers control the current operating configuration of their respective PLLs or clock generation blocks. The Next PLL0 control register $218_0$, Next PLL1 control register $218_1$, Next Clock 0 control register $220_0$, ..., and Next Clock n control register $220_n$ are examples of what are more generally referred to herein as next configuration control registers, as they control the next configuration of their respective PLLs or clock generation blocks, that is, the manner in which such elements are reconfigured.

The sequencer 202 supplies configuration information to load the PLL0 control register $208_0$, PLL1 control register $208_1$, and the clock control registers $210_0$ through $210_n$, in order to implement a particular clock configuration for the processor 102. In an initialization phase of operation, described in more detail below in conjunction with FIG. 4A, the sequencer loads the PLL0 control register $208_0$, PLL1 control register $208_1$, and the clock control registers $210_0$ through $210_n$ based on inputs received from a sample and decode unit 225. The sample and decode unit 225 samples external clock configuration signal lines, which in this example include Reset Config IO lines, and decodes the resulting samples to determine an initial clock configuration for the processor. The sampling may be implemented using one or more otherwise conventional sampling registers, with the decoding of the samples being provided by additional logic circuitry. It is to be appreciated, however, that the term "sampling" as used herein is intended to be construed broadly, so as to encompass any technique for extracting configuration information from external clock configuration signal lines.

The sample and decode unit also receives additional signals, including a reset signal denoted RSTB, and a reference clock signal denoted REF_CLK. In this embodiment, the reference clock signal is used to do the sampling. The sampling and decoding of the Reset Config IO lines typically occurs during a so-called "hard" reset, initiated by the externally-supplied reset signal, and provides configuration information specifying an initial operating point. Based on this configuration information, the sequencer 202 loads the control registers $208_0$, $208_1$ and $210_0$ through $210_n$ in order to provide the corresponding initial clock configuration for the processor.

The Reset Config IO lines may be, for example, address lines or other types of integrated circuit output pins that are tri-stated, in conjunction with the hard reset, so as to be usable as inputs. Alternatively, these lines could correspond to dedicated clock configuration pins. Both of these types of arrangements are considered examples of what are more generally referred to herein as "external clock configuration signal lines." In a given embodiment, logic states of two lines can be used to indicate a particular one of four possible initial clock configurations, or more generally logic states of m lines can used to indicate a particular one of $2^m$ possible configurations. Numerous alternative arrangements of such lines may be used.

In a subsequent reconfiguration of the processor, described in more detail below in conjunction with FIG. 4B, the sequencer 202 loads the PLL0 control register $208_0$, PLL1 control register $208_1$, and the clock control registers $210_0$ through $210_n$ based on inputs received from the control registers 215. The contents of the control registers 215 can be updated under software control via the software interface 221. Thus, a wide variety of different clock configurations are made possible, but without increasing the number of external clock configuration pins or other external signal lines that are required. In a given reconfiguration, one or more of the n+1 different output clocks of the clock generation circuitry 200 may have its rate, or other controllable signal characteristic, altered in a particular manner.

Figure 4A:
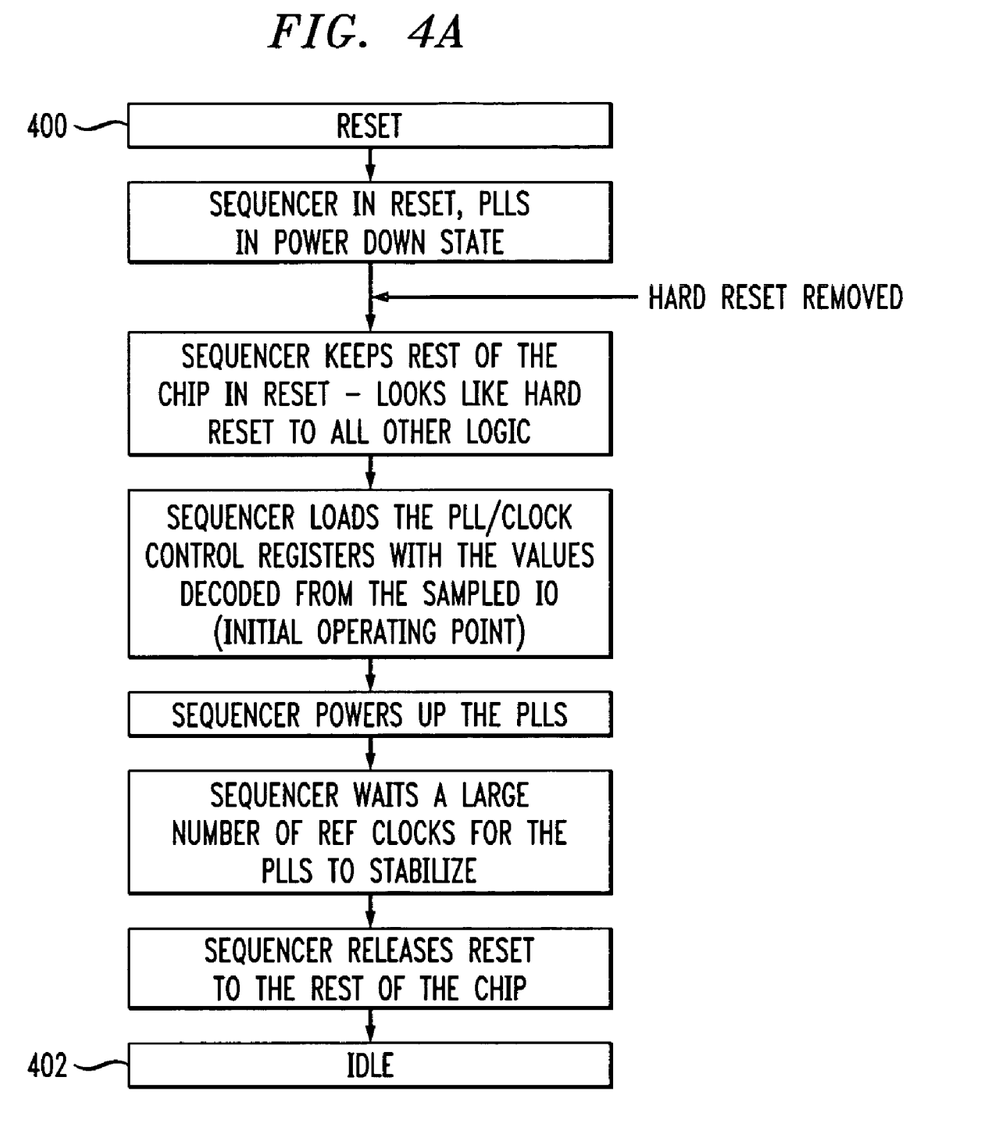
FIGS. 4A and 4B are flow diagrams of a flexible clock configuration process that is implementable in the FIG. 2 network processor utilizing the clock generation circuitry of FIG. 3.

Referring now to FIG. 4A, a flow diagram is shown illustrating one manner in which the clock generation circuitry 200 of FIG. 3 can determine an initial clock configuration for the processor 102 based on sampling of external clock configuration signal lines. In this example, the external clock configuration signals lines comprise the Reset Config IO signals lines applied as inputs to the sample and decode unit 225. These signal lines may correspond to external pins of an integrated circuit that implements the network processor 102. For the following description of FIGS. 4A and 4B, it will be assumed without limitation that the network processor is implemented as an integrated circuit, also referred to as a chip.

The FIG. 4A process begins in a Reset state 400. This reset state is entered upon initiation of a hard reset responsive to the reset signal RSTB applied as an input to the sample and decode unit 225. The network processor integrated circuit should have its hard reset pin asserted during power sequencing. The hard reset keeps the sequencer in reset and the PLLs in a power-down state until both the power and the reference clock are stable. This hard reset state may be viewed as an example of an externally-controlled reset state, as it is controlled by the reset signal RSTB, which as indicated above is typically supplied from a source external to the chip. Such an off-chip source may be, for example, a timer that monitors power sequencing on an associated line card, circuit board or other system component.

During the hard reset, the Reset Config IO pins are sampled by the reference clock to determine the initial clock configuration, that is, the initial operating point. The values of the sampled signals are held and decoded to determine appropriate initial values for storage in the PLL0 control register $208_0$, PLL1 control register $208_1$, and the clock control registers $210_0$ through $210_n$. The initial clock configuration may be one of a number of "safe" yet potentially non-optimum operating points for the chip, since the chip can subsequently be reconfigured to a desired operating point.

After the hard reset is removed, the sequencer keeps the remainder of the chip in reset by supplying an appropriate signal via its reset output 230. This signal may be configured such that it appears to all other logic of the chip as a hard reset. The resulting reset state is an example of an internally-controlled reset state, as it is controlled by the sequencer, which is internal to the processor. The sequencer then loads the PLL0 control register $208_0$, PLL1 control register $208_1$, and the clock control registers $210_0$ through $210_n$ with the values decoded from the sampled Reset Config IO pins. The sequencer then powers up the PLLs, waits a large number of reference clock cycles for the PLLs to stabilize, and finally releases its reset to the rest of the chip. The FIG. 4A process ends in an Idle state 402. At this point, the processor boots up such that the additional control registers 215 can be subject to software control via the interface 221, thereby allowing a reconfiguration of the clock generation circuitry to a desired operating point.

The "large number of reference clock cycles" referred to above is a number suitable to ensure that the PLLs stabilize. For example, each of the PLLs may have a specified lock time which denotes the amount of time from when it is powered on until when its output clock is stable. Such lock times may be on the order of a millisecond, although they will of course vary depending upon the particular PLL. Thus, one should wait that amount of time or more before coming out of reset. As a more particular example, if the reference clock is 50

MHz, and the PLL has a lock time of 1 millisecond, a suitable number of reference clock cycles to wait for PLL stabilization may be on the order of 500,000 cycles, although 50,000 clock cycles would correspond to the minimum amount meeting the 1 millisecond lock time. It is preferable to have a substantial amount of margin, in that if reset is released before the PLLs have stabilized, the processor may enter unknown states due to clock glitching. The number of reference clock cycles that the sequencer waits before releasing reset may be made programmable.

In other embodiments, a given PLL may generate a lock signal which indicates that its output clock is stable. Thus, instead of waiting a particular number of reference clock signals, one can simply wait until receipt of a lock signal from the PLL. Numerous other techniques may be used to ensure that PLL outputs are stable before the reset is released.

Figure 4B:
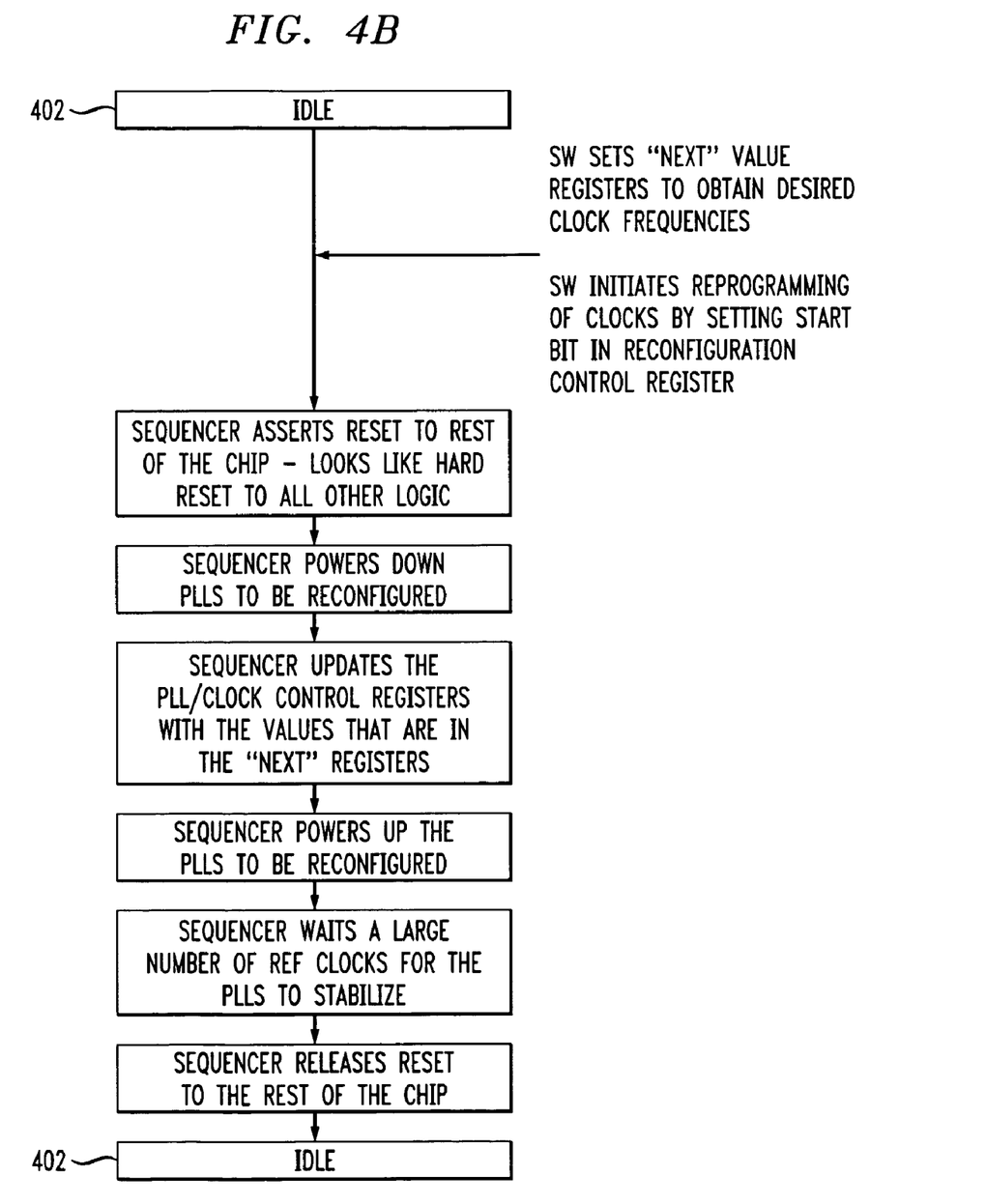

FIG. 4B is a flow diagram illustrating one manner in which the clock generation circuitry 200 can determine a subsequent clock configuration for the processor 102 based on contents of the additional control registers 215. It is assumed that the initial operating point has already been determined in accordance with the process outlined in FIG. 4A. The reconfiguration process of FIG. 4B begins in the same Idle state 402 which ended the initialization process of FIG. 4A. The software, which as noted above may be running on a CPU or other processor core or on an external host processor, sets the Next control registers $218_0$, $218_1$ and $220_0$ through $220_n$ to values that will result in the desired output clock frequencies. The software then initiates reprogramming of the clocks by setting a start bit in the reconfiguration control register 217.

At this point, the sequencer 202 asserts reset to the rest of the chip, by supplying an appropriate signal via its reset output 230. Again, this signal may be configured such that it appears to all other logic of the chip as a hard reset. The sequencer then powers down the PLLs to be reconfigured, and loads the PLL0 control register $208_0$, PLL1 control register $208_1$, and the clock control registers $210_0$ through $210_n$ with the values stored in the respective Next control registers $218_0$, $218_1$ and $220_0$ through $220_n$. The sequencer then powers up the PLLs, waits a large number of reference clock cycles for the PLLs to stabilize, and finally releases its reset to the rest of the chip. The FIG. 4B process ends in the Idle state 402. Again, rather than waiting a particular number of reference clock cycles, one can use PLL lock signals, if available, as indicators of PLL output stability.

Any desired number of additional reconfigurations can be achieved by simply loading the appropriate values in the Next registers and repeating the remaining steps of the FIG. 4B reconfiguration process. The particular operating point of the clock generation circuitry 200 and its associated processor 102 can thereby be easily and flexibly altered as needed to accommodate changes in processing application, system configuration, processing load, etc. Advantageously, this flexible reconfiguration is achieved without increasing the number of external clock configuration pins, or requiring flash memory with its associated cost and complexity. In the illustrative embodiment, boot software may be used to configure all the clock rates, even the clock rate of the processor core itself.

An example of one possible 8-bit implementation of the reconfiguration control register 217 is shown in TABLE 1 below. TABLES 2A and 2B show one possible implementation of the PLL0 control registers $208_0$ as a pair of 8-bit registers. A similar format may be used for the PLL1 control register $208_1$. Of course, numerous alternative register formats may be used for these and other registers in other embodiments.

TABLE 1

Reconfiguration Control Register Format

| bits | Name | Description |
|---|---|---|
| 7 | Start_reconfiguration | When set, the sequencer starts reconfiguring the PLLs and the clock generation blocks. This bit is cleared when the reconfiguration is complete. |
| 6 | Reset_chip | When this bit is set, the sequencer resets the chip before reconfiguring the clocks. This bit should always be set when the start_reconfiguration bit is set. |
| 5 | reconfig_PLL1 | When set, the sequencer reconfigures PLL1 during the clock reconfiguration sequence. This bit should always be set when the start_reconfiguration bit is set. |
| 4 | reconfig_PLL0 | When set, the sequencer reconfigures PLL0 during the clock reconfiguration sequence. This bit should always be set when the start_reconfiguration bit is set. |
| 3:2 | Lock_time | This field controls how long the sequencer waits for the PLLs to stabilize before taking the chip out of reset during the clock reconfiguration sequence. The encoding for this field is:<br>00  wait 524,286 ref clocks for PLLs to lock<br>01  wait 262,143 ref clocks for PLLs to lock<br>10  wait 131,072 ref clocks for PLLs to lock<br>11  wait 65,536 ref clocks for PLLs to lock<br>It is recommended that this field should be set to 00 when the start_reconfiguration bit is set. |
| 1:0 | Scratch | These bits will maintain their value during a clock reconfiguration sequence. They can be used by software for state maintenance. |

TABLE 2A

PLL0 Control Register Part 1

| bits | Name | Description |
|---|---|---|
| 7 | PLL0_PD | PLL0 PLL is powered down when this bit is set |
| 6 | PLL0_bypass | Controls PLL's bypass input. Must be cleared to 0 for PLL to operate. |
| 5 | PLL0_clock_O D | VCO_out clock is divided by two when this bit is set. |
| 4 | PLL0_OEB | Controls PLL's output enable input signal (active low signal). Must be cleared to 0 for PLL to operate. |
| 3:0 | PLL0_clock_R | Input clock frequency divide; the reference clock frequency divided by this number in the illustrative embodiment is between 10 MHz and 50 MHz. |

TABLE 2B

PLL0 Control Register Part 2

| Bits | name | Description |
|---|---|---|
| 7:6 | reserved | |
| 5:0 | PLL0_clock_F | VCO frequency multiply value; |

TABLE 2B-continued

PLL0 Control Register Part 2

| Bits | name | Description |
|---|---|---|
| | | VCO_out = (FIN/(PLL0_clock_R + 1)) *2* (PLL0_clock_F + 2) in the illustrative embodiment is between 500 MHz and 1 GHz |

Software used to update control registers in the clock generation circuitry of the illustrative embodiment may run on an internal or external processing element. For example, such software may run on the processor core that is internal to the network processor, or on a host processor that is external to the network processor. Alternative configurations involving, for example, a combination of internal and external processing elements, may be used.

The network processor 102 having clock generation circuitry 200 and multiple clock domains 204 as described previously may be utilized in a wide variety of processing applications. For example, one such application may involve controlling the flow of packets between a physical transmission medium, such as a physical layer portion of, e.g., an asynchronous transfer mode (ATM) network or synchronous optical network (SONET), and a switch fabric in a router or other type of packet switch. Such routers and switches generally include multiple network processors, e.g., arranged in the form of an array of line or port cards with one or more of the processors associated with each of the cards.

Figure 5:
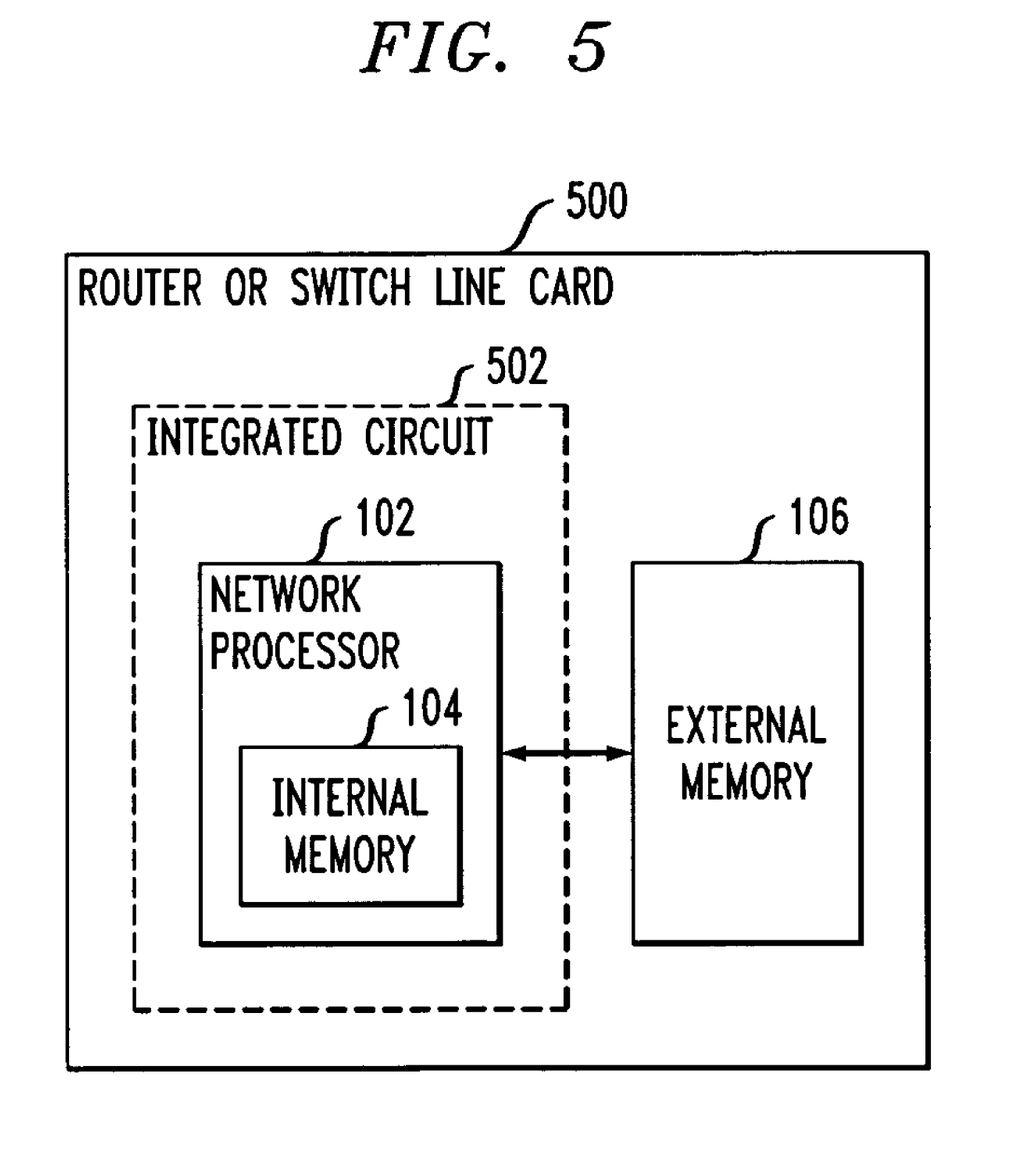
FIG. 5 illustrates the manner in which a network processor can be implemented in the form of an integrated circuit installed on a line card of a router or switch.

In an exemplary packet processing application such as that described above, an integrated circuit installed on a line card of a router or switch may comprise network processor 102. An arrangement of this type is shown in FIG. 5. In this embodiment, a line card 500 has an integrated circuit 502 installed thereon. The integrated circuit 502 comprises network processor 102 having internal memory 104, and may but need not comprise additional circuitry or other elements of a conventional type. The network processor 102 interacts with external memory 106 on the line card 500. The line card 500 as shown in FIG. 5 is considerably simplified for clarity of illustration. It is to be appreciated, however, that such a card may comprise multiple integrated circuits, including, for example, an external host processor of the type noted above, suitable for programming the set of control registers 215. Similar implementations of the invention may be based on one or more port cards of a router or switch.

It is apparent from the foregoing that a given embodiment of the present invention may comprise one or more integrated circuits. In such an arrangement, a plurality of identical die is typically formed in a repeated pattern on a surface of a semiconductor wafer. Each die may include a variety of structures or circuits. The individual die are cut or diced from the wafer, then packaged as an integrated circuit. One skilled in the art would know how to dice wafers and package die to produce integrated circuits. Integrated circuits so manufactured are considered part of this invention.

The above-described embodiments of the invention are intended to be illustrative only. For example, although the illustrative embodiments utilize particular numbers, types and arrangements of control registers, the invention may be implemented using a wide variety of other control register configurations. For example, a single register may store next configuration information for multiple PLLs and/or clock generation blocks. Also, a wide variety of different numbers, types and arrangements of PLLs or clock generation blocks may be used. It should also be appreciated that the particular process steps shown in FIGS. 4A and 4B are merely examples, and alternative embodiments may use different processes for determining an initial clock configuration and a subsequent reconfiguration. These and numerous other alternative embodiments within the scope of the following claims will be apparent to those skilled in the art.

What is claimed is:

1. A method of clock configuration in a processor, the method comprising the steps of:

sampling one or more external clock configuration signal lines of the processor;

determining a first clock configuration for the processor based on the sampling;

configuring a clock generator in accordance with the first clock configuration;

subsequently determining a second clock configuration for the processor, different than the first clock configuration, based on contents of at least one control register subject to software-based updating; and reconfiguring the clock generator in accordance with the second clock configuration;

wherein the step of subsequently determining a second clock configuration for the processor further comprises the step of reading configuration information from at least one next configuration control register; and wherein the step of reconfiguring the clock generator in accordance with the second clock configuration comprises loading the configuration information read from the next configuration control register into a current configuration control register associated with the clock generator.

2. The method of claim 1 wherein the sampling step comprises sampling the one or more external clock configuration signal lines utilizing an externally-supplied reference clock.

3. The method of claim 1 wherein the determining step comprises decoding one or more values obtained via the sampling.

4. The method of claim 1 wherein the clock generator comprises at least one phase-locked loop coupled to at least one clock generation block.

5. The method of claim 1 wherein the clock generator provides an output clock signal at a first rate in the first clock configuration and provides the output clock signal at a second rate, different than the first rate, in the second clock configuration.

6. The method of claim 1 wherein the sampling step occurs responsive to the processor exiting an externally-controlled reset state.

7. The method of claim 1 wherein the configuring and reconfiguring steps comprise loading respective first and second configuration information into one or more additional control registers associated with the clock generator.

8. A method of clock configuration in a processor, the method comprising the steps of:

sampling one or more external clock configuration signal lines of the processor;

determining a first clock configuration for the processor based on the sampling;

configuring a clock generator in accordance with the first clock configuration;

subsequently determining a second clock configuration for the processor, different than the first clock configuration, based on contents of at least one control register subject to software-based updating; and reconfiguring the clock generator in accordance with the second clock configuration;

wherein a given one of the configuring and reconfiguring steps is performed in clock generation circuitry of the processor, said clock generation circuitry comprising at least the control register and the clock generator, while additional circuitry of the processor is maintained in an internally-controlled reset state until an output of the clock generator has stabilized.

9. An apparatus comprising:
clock generation circuitry adapted to generate one or more clock signals for an associated processor, the clock generation circuitry comprising at least one clock generator and at least one control register subject to software-based updating;
wherein said clock generation circuitry is configured to determine a first clock configuration for the processor based on sampling one or more external clock configuration signal lines of the processor, and to configure the clock generator in accordance with the first clock configuration;
wherein said clock generation circuitry is configured to subsequently determine a second clock configuration for the processor, different than the first clock configuration, based on contents of said at least one control register subject to software-based updating, and to reconfigure the clock generator in accordance with the second clock configuration;
wherein the clock generation circuitry determines the second clock configuration for the processor by reading configuration information from at least one next configuration control register; and
wherein the clock generator is reconfigured in accordance with the second clock configuration by loading the configuration information read from the next configuration control register into a current configuration control register associated with the clock generator.

10. The apparatus of claim 9 wherein the clock generator comprises at least one phase-locked loop coupled to at least one clock generation block.

11. The apparatus of claim 10 wherein the phased-locked loop and the clock generation block have respective current configuration control registers associated therewith.

12. The apparatus of claim 10 wherein the phased-locked loop and the clock generation block have respective next configuration control registers associated therewith.

13. The apparatus of claim 9 wherein the at least one control register subject to software-based updating comprises at least one next configuration control register associated with the clock generator.

14. An apparatus comprising:
clock generation circuitry adapted to generate one or more clock signals for an associated processor, the clock generation circuitry comprising at least one clock generator and at least one control register subject to software-based updating;
wherein said clock generation circuitry is configured to determine a first clock configuration for the processor based on sampling one or more external clock configuration signal lines of the processor, and to configure the clock generator in accordance with the first clock configuration;
wherein said clock generation circuitry is configured to subsequently determine a second clock configuration for the processor, different than the first clock configuration, based on contents of said at least one control register subject to software-based updating, and to reconfigure the clock generator in accordance with the second clock configuration: and
wherein said clock generation circuitry further comprises a sequencer, said sequencer being operative to configure the clock generator in accordance with the first or second clock configurations and to maintain additional circuitry of the processor in an internally-controlled reset state until an output of the clock generator has stabilized.

15. A processor comprising:
clock generation circuitry adapted to generate one or more clock signals for the processor, the clock generation circuitry comprising at least one clock generator and at least one control register subject to software-based updating; and
one or more clock domains adapted to receive the one or more clock signals from the clock generation circuitry;
wherein said clock generation circuitry is configured to determine a first clock configuration for the processor based on sampling one or more external clock configuration signal lines of the processor, and to configure the clock generator in accordance with the first clock configuration;
wherein said clock generation circuitry is configured to subsequently determine a second clock configuration for the processor, different than the first clock configuration, based on contents of said at least one control register subject to software-based updating, and to reconfigure the clock generator in accordance with the second clock configuration;
wherein the clock generation circuitry determines the second clock configuration for the processor by reading configuration information from at least one next configuration control register; and
wherein the clock generator is reconfigured in accordance with the second clock configuration by loading the configuration information read from the next configuration control register into a current configuration control register associated with the clock generator.

16. The processor of claim 15 wherein said processor is implemented in the form of an integrated circuit.

17. The processor of claim 15 wherein the at least one clock domain comprises at least one of a processor core domain, a memory domain and a host processor domain.

18. The processor of claim 15 wherein the processor comprises a network processor.

* * * * *